US009244159B1

(12) United States Patent
Korchev et al.

(10) Patent No.: US 9,244,159 B1
(45) Date of Patent: Jan. 26, 2016

(54) DISTINGUISHING BETWEEN MARITIME TARGETS AND CLUTTER IN RANGE-DOPPLER MAPS

(71) Applicant: The Boeing Company, Chicago, IL (US)

(72) Inventors: Dmitriy V. Korchev, Irvine, CA (US); Yuri Owechko, Newbury Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 445 days.

(21) Appl. No.: 13/755,150

(22) Filed: Jan. 31, 2013

(51) Int. Cl.
G01S 7/35 (2006.01)
(52) U.S. Cl.
CPC ...................................... *G01S 7/354* (2013.01)
(58) Field of Classification Search
CPC ...................................................... G01S 7/354
USPC ............ 342/90, 159, 162, 176, 179, 195, 197
See application file for complete search history.

(56) References Cited

U.S. PATENT DOCUMENTS

| 5,748,140 | A * | 5/1998 | Schober | 342/90 |
| 5,805,742 | A * | 9/1998 | Whitsitt | 382/275 |
| 6,535,632 | B1 * | 3/2003 | Park et al. | 382/164 |
| 2004/0057597 | A1 * | 3/2004 | Rhoads | 382/100 |
| 2005/0093992 | A1 * | 5/2005 | Fukumoto | 348/222.1 |
| 2006/0083418 | A1 * | 4/2006 | Watson et al. | 382/133 |
| 2011/0279685 | A1 * | 11/2011 | Alahi et al. | 348/187 |
| 2014/0292762 | A1 * | 10/2014 | Kondo | 345/428 |

FOREIGN PATENT DOCUMENTS

EP 2833322 A1 * 2/2015

OTHER PUBLICATIONS

Steger, "An Unbiased Detector of Curvilinear Structures," IEEE Transactions on Pattern Analysis and Machine Intelligience, vol. 20, No. 2, Feb. 1998, pp. 113-124.
Bilmes, "A Gentle Tutorial of the EM Algorithm and its Application to Parameter Estimation for Gaussian Mixture and Hidden Markov Models," International Computer Science Institute, Apr. 1998, 15 pages.
Wang et al., "Removal of azimuth ambiguities and detection of a ship: using polarimetric airborne C-band SAR images," International Journal of Remote Sensing, vol. 33, No. 10, May 2012, pp. 3197-3210.
Lu et al, "A Target Detection Method in Range-Doppler Domain from SAR Echo Data," 16th International Conference on Pattern Recognition, vol. 1, Aug. 2002, pp. 91-94.

* cited by examiner

*Primary Examiner* — John B Sotomayor
(74) *Attorney, Agent, or Firm* — Yee & Associates, P.C.

(57) ABSTRACT

A method and target detector for detecting targets. A number of bright pixels are identified in an image. Each of the number of bright pixels belongs to a line detected in the image in which the line represents a candidate for a target. A number of feature vectors are identified for the number of bright pixels in the image. Each of the number of feature vectors is classified as one of a target vector representing the target and a clutter vector representing clutter.

20 Claims, 10 Drawing Sheets
(7 of 10 Drawing Sheet(s) Filed in Color)

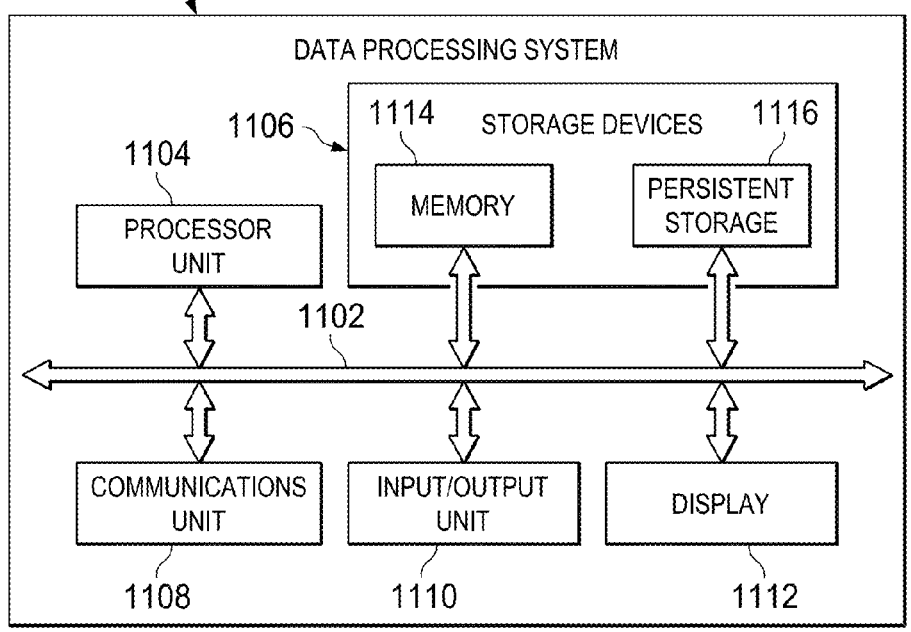
FIG. 11
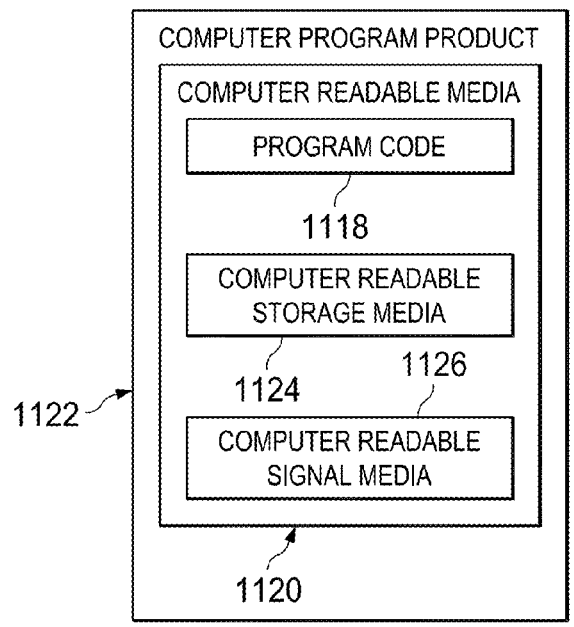

DISTINGUISHING BETWEEN MARITIME TARGETS AND CLUTTER IN RANGE-DOPPLER MAPS

BACKGROUND INFORMATION

1. Field

The present disclosure relates generally to processing radar images and, in particular, to detecting targets within radar images. Still more particularly, the present disclosure relates to a method for distinguishing between maritime targets and clutter within radar images.

2. Background

Radar systems are widely used in performing operations such as, for example, without limitation, target detection, target tracking, traffic monitoring, weapon targeting, and other types of operations. In particular, radar systems are oftentimes used in performing maritime operations such as, for example, without limitation, ship detection, ship tracking, ship traffic monitoring, and other types of maritime operations.

For example, a radar system may be used to generate one or more radar images that may, in turn, be used to detect the presence of one or more objects of interest. The radar images generated may be, for example, range-Doppler maps. As one illustrative example, a radar system, such as a synthetic aperture radar (SAR) system, may be mounted to an unmanned aerial vehicle (UAV) or some other type of aircraft. The synthetic aperture radar system may be used to generate range-Doppler maps of the sea as the unmanned aerial vehicle flies over the sea. These range-Doppler maps may then be used to detect the presence of objects of interest at sea such as, for example, ships. In some cases, these range-Doppler maps may be used to track the movement of objects of interest over time.

As used herein, a "target" in a range-Doppler map represents an object of interest that the radar system is intended to detect. Oftentimes, a target, such as a ship, appears as a bright vertical line in a range-Doppler map. However, clutter may also appear as one or more bright vertical lines in a range-Doppler map. Consequently, distinguishing between targets and clutter may be more difficult than desired.

As used herein, "clutter" in a range-Doppler map includes any indications within the range-Doppler map that do not represent the object of interest. Clutter may be caused by any number of factors. For example, clutter may be generated in response to undesired contributions to the return signal received by the radar system. Further, clutter may be generated in response to, for example, without limitation, object echoes, jamming signals, noise, unintentional interference, atmospheric interface, sea clutter such as moving sea wave crests, and/or other types of contributions.

Some currently available image processing techniques may be unable to distinguish between targets and clutter with a desired level of accuracy. For example, some currently available image processing techniques use line detection and adaptive thresholding to detect targets. However, these techniques may produce a higher rate of false detections, or false alarms, than desired. Consequently, the detections made by these types of image processing techniques may be less useful than desired for ship detection, ship tracking, and/or other types of applications. Therefore, it would be desirable to have a method and apparatus that takes into account at least some of the issues discussed above, as well as other possible issues.

SUMMARY

In one illustrative embodiment, a method is provided. A number of bright pixels are identified in the image. Each of the number of bright pixels belongs to a line detected in the image in which the line represents a candidate for a target. A number of feature vectors are identified for the number of bright pixels in the image. Each of the number of feature vectors is classified as one of a target vector representing the target and a clutter vector representing clutter.

In another illustrative embodiment, a target detector comprises a line detector and a classifier. The line detector is configured to identify a number of bright pixels in the image. Each of the number of bright pixels belongs to a line that represents a candidate for a target. The classifier is configured to identify a number of feature vectors for the number of bright pixels in the image and classify each of the number of feature vectors as one of a target vector representing the target and a clutter vector representing clutter.

In yet another illustrative embodiment, a target detection system comprises a radar system and a target detector. The radar system is configured to generate a radar image. The target detector is configured to identify a number of bright pixels in the radar image. Each of the number of bright pixels belongs to a line that represents a candidate for a target. The target detector is further configured to identify a number of feature vectors for the number of bright pixels in the radar image. The target detector is further configured to classify each of the number of feature vectors as one of a target vector representing the target and a clutter vector representing clutter.

The features and functions can be achieved independently in various embodiments of the present disclosure or may be combined in yet other embodiments in which further details can be seen with reference to the following description and drawings.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a data processing system in the form of a block diagram in accordance with an illustrative embodiment.

DETAILED DESCRIPTION

The illustrative embodiments recognize and take into account different considerations. For example, the illustrative embodiments recognize and take into account that it may be desirable to have a method for detecting targets and, in particular, maritime targets, using radar images. As used herein, a "maritime target" is a target that is connected to the sea, related to the sea, and/or located at or around the sea.

In particular, the illustrative embodiments recognize and take into account that having a method for distinguishing between maritime targets and clutter with a desired level of accuracy may improve target detection and tracking. Thus, the illustrative embodiments provide a method for detecting lines in radar images and determining which of these lines represent maritime targets and which lines represent clutter.

Figure 1:
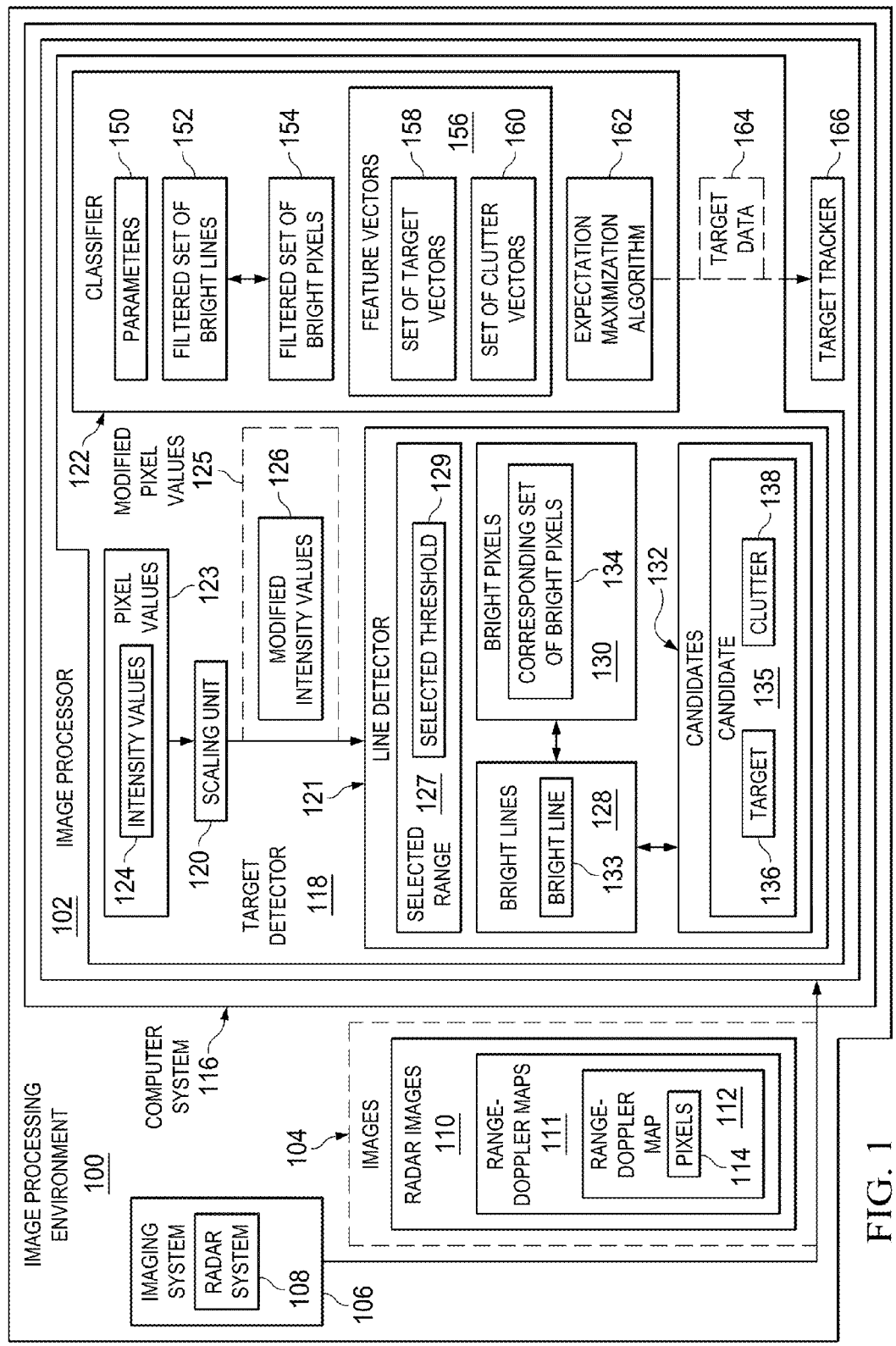
FIG. 1 is an illustration of an image processing environment in the form of a block diagram in accordance with an illustrative embodiment.

Referring now to the figures and, in particular, with reference to FIG. 1, an illustration of an image processing environment in the form of a block diagram is depicted in accordance with an illustrative embodiment. In FIG. 1, the image processing environment 100 includes an image processor 102. The image processor 102 is configured to process images 104 generated by an imaging system 106.

In these illustrative examples, the imaging system 106 takes the form of a radar system 108 that generates images 104 in the form of radar images 110. In one illustrative example, these radar images 110 take the form of range-Doppler maps 111. Range-Doppler maps 111 may be generated based on other types of radar images, such as, for example, without limitation, synthetic aperture radar (SAR) images. Each one of range-Doppler maps 111 may be comprised of pixels 114 arranged in rows and columns.

The image processor 102 is configured to receive the range-Doppler maps 111 generated by the radar system 108 and perform target detection. Depending on the implementation, the image processor 102 may be implemented using hardware, software, or a combination of the two. As one illustrative example, the image processor 102 may be implemented using a computer system 116. The computer system 116 may be comprised of one or more computers. When more than one computer is present in the computer system 116, these computers may be in communication with each other.

As depicted, the image processor 102 includes a target detector 118 that is configured to perform the target detection. In some cases, the target detector 118 and the radar system 108 may be together considered a target detection system. The target detector 118 may include a scaling unit 120, a line detector 121, and a classifier 122.

The target detector 118 is configured to receive the range-Doppler maps 111 generated by the radar system 108 for processing. For example, the target detector 118 receives a range-Doppler map 112 for processing. The target detector 118 identifies pixel values 123 for the pixels 114 in the range-Doppler map 112. The pixel values 123 may comprise intensity values 124 in these examples.

The scaling unit 120 in the target detector 118 may be configured to scale the pixel values 123 to form modified pixel values 125, which may also be referred to as scaled pixel values. More specifically, the scaling unit 120 may scale the intensity values 124 to form modified intensity values 126, which may also be referred to as scaled intensity values.

The scaling unit 120 may use a scaling algorithm to perform this scaling. The scaling may be performed to ensure that the mean of the intensity values 124 of the pixels 114 in the range-Doppler map 112 is within a selected range. Scaling may allow improved performance of the line detection performed by the line detector 121.

In one illustrative example, each of the intensity values 124 may be a value between 0 and 256. A higher intensity value may mean a brighter pixel. The scaling unit 120 may scale each of the intensity values 124 by dividing the intensity value by a mean of the intensity values 124 and then multiplying this result by a selected scaling factor. The scaling factor may be, for example, without limitation, 20, 30, 40, 50, or some other type of scaling factor.

Once the modified intensity values 126 have been generated, the line detector 121 uses the modified intensity values 126 to identify a number of bright lines 128 in the range-Doppler map 112. As used herein, a "number of" items may be one or more items. In this manner, a number of bright lines 128 may be one or more bright lines.

A "bright line," as used herein, may comprise one or more bright pixels. The line detector 121 may identify each pixel in the range-Doppler map 112 having a modified intensity value, or scaled intensity value, within a selected range 127 as a bright pixel. For example, the line detector 121 may identify each pixel in the range-Doppler map 112 having a modified intensity value above a selected threshold 129 as a bright pixel.

When one or more bright pixels are consecutively located within the same column in the range-Doppler map 112, these bright pixels may be referred to as a bright line. In other words, a bright line is a vertical line of one or more bright pixels. More specifically, each of the bright lines 128 may represent a vector of one or more detected bright pixels. In this manner, the one or more bright lines 128 detected by the line detector 121 may be comprised of a number of bright pixels 130.

As depicted, the bright lines 128 may represent a number of candidates 132. For example, a bright line 133 identified by the line detector 121 may be comprised of a corresponding set of bright pixels 134. As used herein, a "set of" items may be one or more items. In this manner, a set of bright pixels 134 may be one or more pixels. Further, this bright line 133 may represent a candidate 135. This candidate 135 may be an indication within the range-Doppler map 112 that is either a target 136 or clutter 138.

As used herein, a target 136 is an indication in the range-Doppler map 112 that represents an object of interest that is to be detected. For example, the target 136 may be a maritime target, such as a ship. The clutter 138, as used herein, is an indication in the range-Doppler map 112 that does not represent the object of interest. Rather, the clutter 138 may be an undesired or unwanted indication.

The clutter 138 may be caused by any number of factors. For example, the clutter 138 may be generated in response to undesired contributions to the return signal received by the radar system. The clutter 138 may be generated in response to, for example, without limitation, object echoes, jamming signals, noise, unintentional interference, atmospheric interface, sea clutter such as moving sea wave crests, and/or other types of contributions. In some cases, the clutter 138 may be an artifact produced by the imaging process itself.

In some cases, the corresponding set of bright pixels 134 that form a bright line 133 may represent both a target and clutter 138. The classifier 122 in the target detector 118 is configured to distinguish which pixels, if any, in the corresponding set of bright pixels 134 represent a target 136 and which pixels, if any, in the corresponding set of bright pixels 134 represent clutter 138.

Once the bright lines 128 have been identified by the line detector, the classifier 122 processes the bright pixels 130 using a number of parameters 150. These parameters 150 may include at least one of an upper image bound, a lower image bound, a line width, and symmetry.

The upper image bound may be, for example, without limitation, a row of the pixels 114 in the range-Doppler map 112 above which pixels should not be considered as representing a target. Similarly, the lower image bound may be, for example, without limitation, a row of the pixels 114 in the range-Doppler map 112 below which pixels should not be considered as representing a target. The classifier 122 may be configured to remove any of the bright pixels 130 above the upper image bound or below the lower image bound from consideration as potentially representing a target.

With respect to the parameter of the line width, the classifier 122 may be configured to remove the portion of the bright pixels 130 belonging to any of the bright lines 128 that have a width greater than the line width from consideration as potentially representing a target. The line width may be, for example, without limitation, one column.

With respect to the parameter of symmetry, the classifier 122 is configured to remove any of the bright lines 128 that form a symmetrical pair within the range-Doppler map 112 from consideration as representing a target. More specifically, two bright lines that are horizontally symmetric within the range-Doppler map with respect to a center line may be removed from consideration as representing a target.

In this manner, the classifier 122 uses the parameters 150 to form a filtered set of bright lines 152 comprising a filtered set of bright pixels 154. The filtered set of bright lines 152 includes the subset of the bright lines 128 not filtered out by the classifier 122 based on the parameters 150. Similarly, the filtered set of bright pixels 154 includes the subset of the bright pixels 130 not filtered out by the classifier 122 based on the parameters 150.

The classifier 122 identifies a feature vector for each bright pixel of the filtered set of bright pixels 154 to form a number of feature vectors 156. As used herein, the "feature vector" for a bright pixel is the row of pixels in the range-Doppler map 112 having a selected width centered at the bright pixel.

Each of the feature vectors 156 may be classified as one of a target vector representing a target and a clutter vector representing clutter. A target vector is a feature vector centered at a bright pixel representing a target. A clutter vector is a feature vector centered at a bright pixel representing clutter.

The classification of the feature vectors 156 as target vectors and clutter vectors may be performed using, for example, a maximum-likelihood estimation algorithm. In one illustrative example, this maximum-likelihood estimation algorithm takes the form of an expectation maximization algorithm 162. The classifier 122 may classify the feature vectors 156 into a set of target vectors 158 and a set of clutter vectors 160 using the expectation maximization algorithm 162.

The classifier 122 outputs target data 164 based on the classification of the feature vectors 156 as target vectors and clutter vectors. The target data 164 may indicate which of the bright pixels 130 belong to bright lines representing targets and which of the bright pixels 130 belong to bright lines representing clutter.

This target data 164 may be used to perform a number of different operations. For example, the target data 164 generated by the classifier 122 for each of the range-Doppler maps 111 received may be sent to a target tracker 166 in the image processor 102 and used to track targets.

The illustration of image processing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some illustrative examples, the pixel values 123 may not be scaled by the scaling unit 120 prior to being processed by the line detector 121. In other words, the scaling unit 120 may be optional within the target detector 118.

Figure 2:
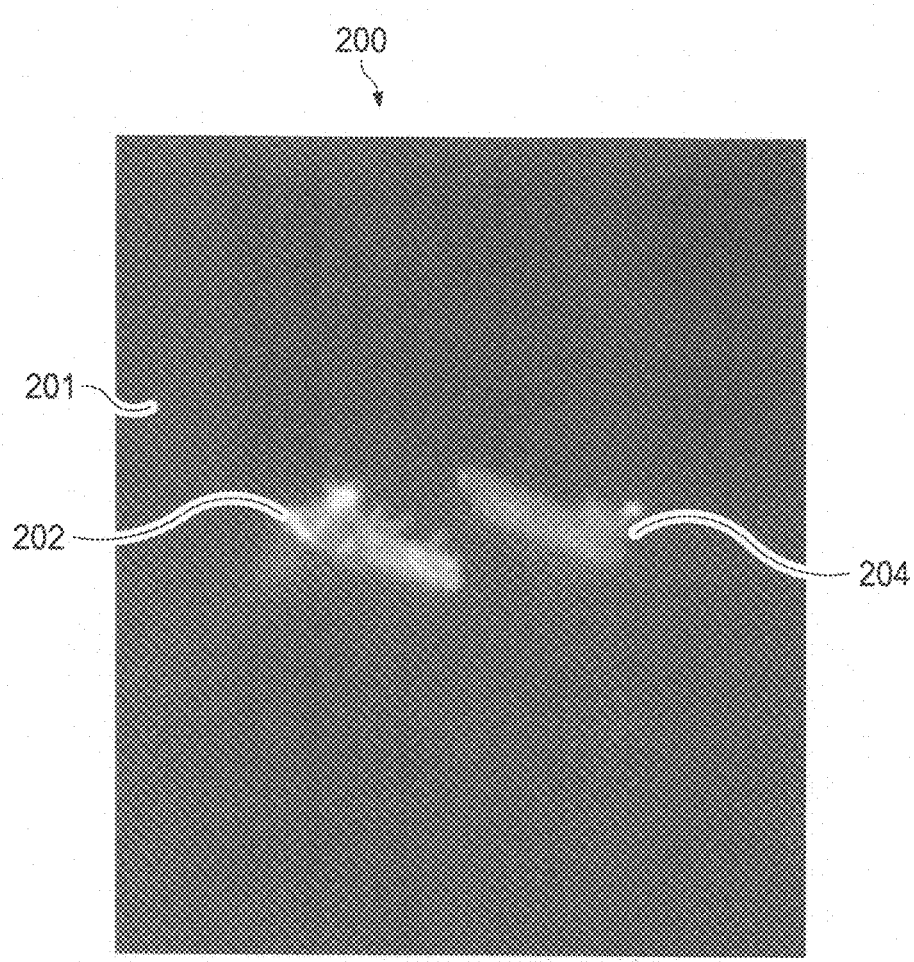
FIG. 2 is an illustration of an infrared image in accordance with an illustrative embodiment.

With reference now to FIG. 2, an illustration of an infrared image is depicted in accordance with an illustrative embodiment. In FIG. 2, the infrared image 200 is an example of an image of actual ships that may be considered objects of interest. The infrared image 200 captures the sea 201, a first ship 202, and a second ship 204. In this illustrative example, the first ship 202 and the second ship 204 are traveling in opposite directions. A range-Doppler map, such as the range-Doppler map 112 described in FIG. 1, capturing the first ship 202 and the second ship 204, is depicted below in FIG. 3.

Figure 3:
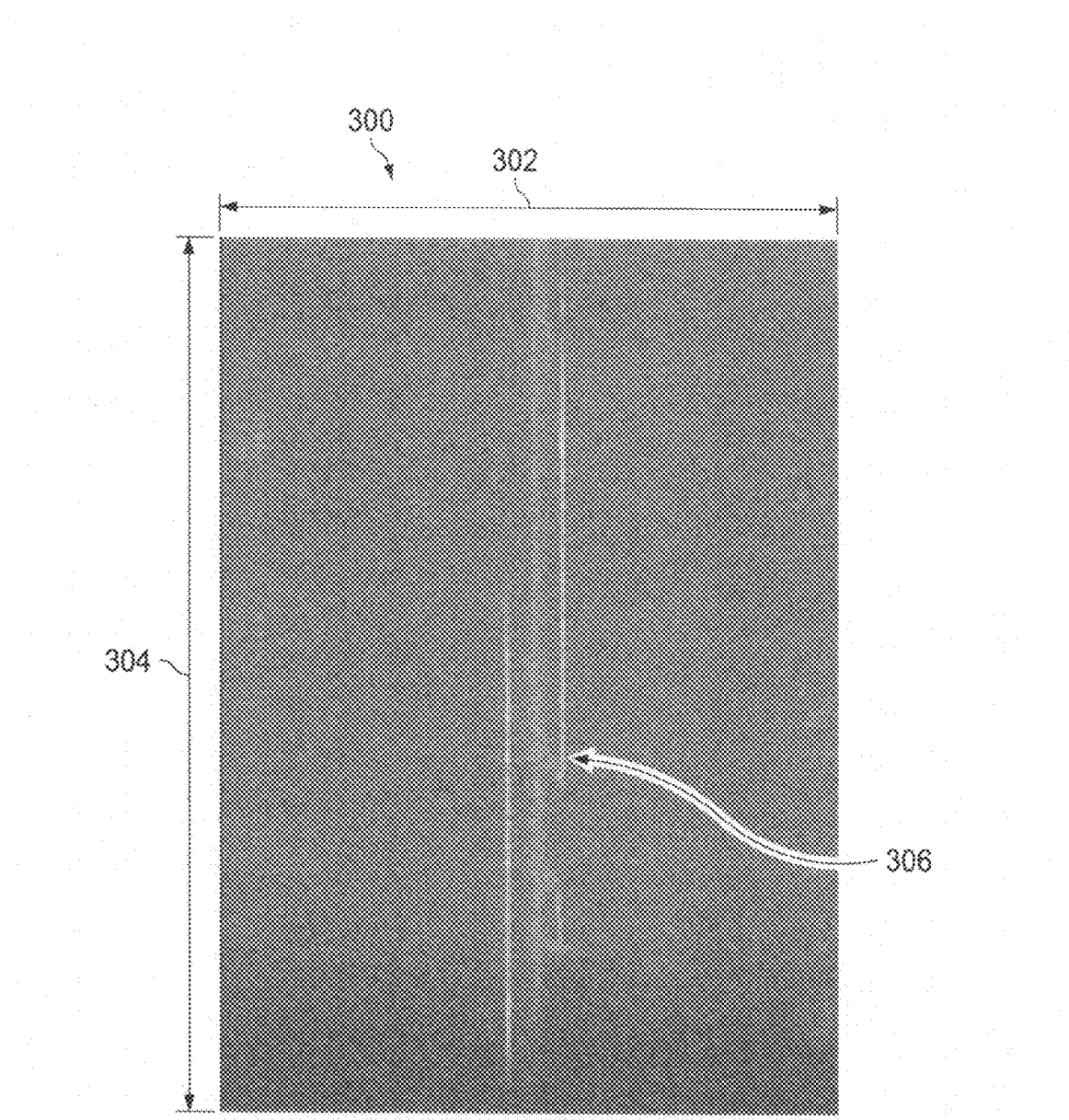
FIG. 3 is an illustration of a range-Doppler map in accordance with an illustrative embodiment.

Turning now to FIG. 3, an illustration of a range-Doppler map is depicted in accordance with an illustrative embodiment. In FIG. 3, the range-Doppler map 300 is an example of one implementation for the range-Doppler map 112 described in FIG. 1. This range-Doppler map 300 captures the first ship 202 and the second ship 204 seen in the infrared image 200 in FIG. 2.

As depicted, the range-Doppler map 300 may be comprised of rows of pixels arranged in a horizontal direction 302 and columns of pixels arranged in a vertical direction 304. The horizontal direction 302 represents velocity, while the vertical direction 304 represents range. Bright lines 306 have been detected within the range-Doppler map 300. These bright lines 306 may have been detected by, for example, without limitation, the line detector 121 described in FIG. 1.

The classifier 122 described in FIG. 1 may be used to determine which of these bright lines 306 and/or which portions of these bright lines 306 represent targets and which of these bright lines 306 and/or which portions of these bright lines 306 represent clutter.

Figure 4:
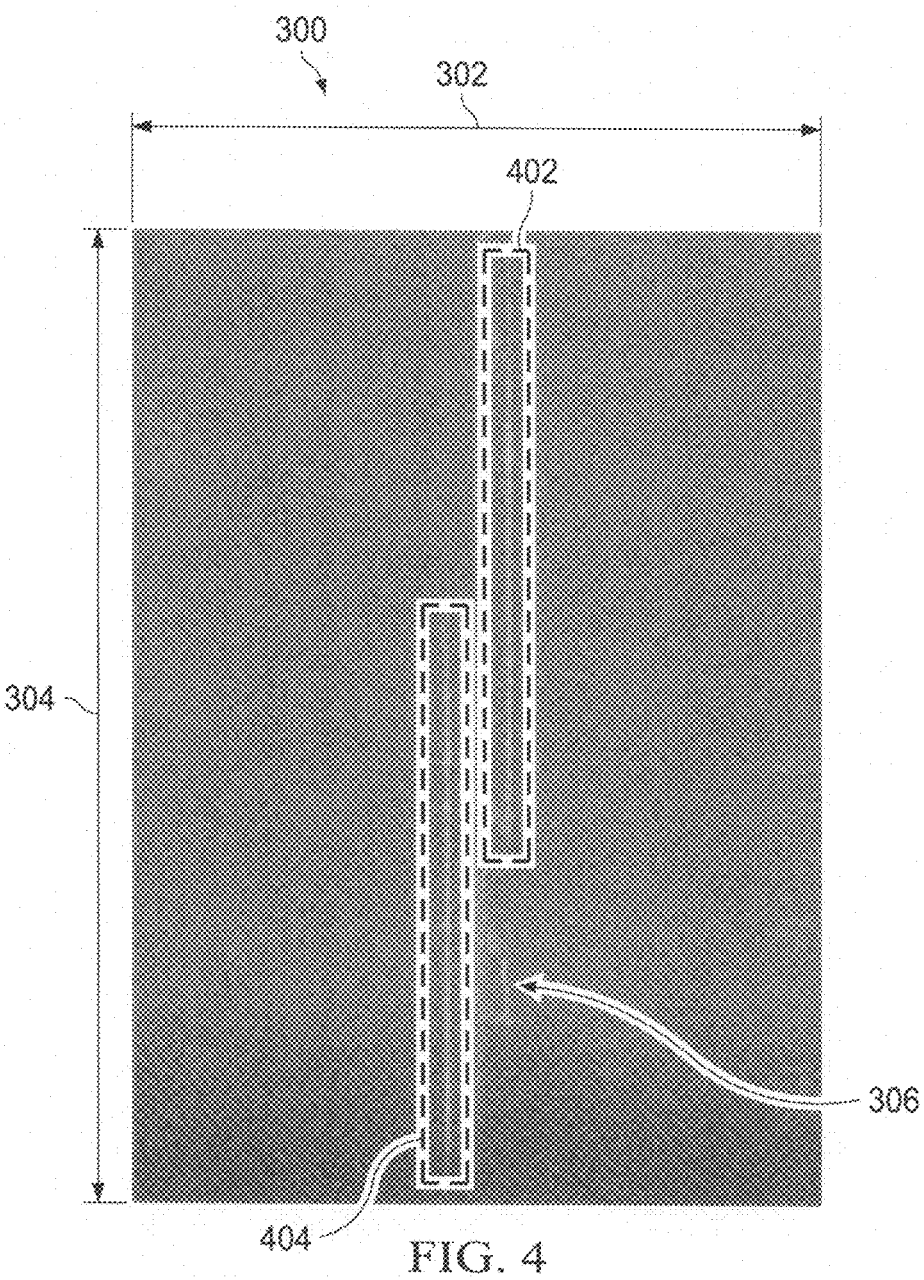
FIG. 4 is an illustration of a range-Doppler map in accordance with an illustrative embodiment.

With reference now to FIG. 4, an illustration of the range-Doppler map 300 from FIG. 3 is depicted in accordance with an illustrative embodiment. As depicted, the classifier 122 from FIG. 1 has determined that only a first bright line 402 and a second bright line 404 of the bright lines 306 have been identified as targets.

Figure 5:
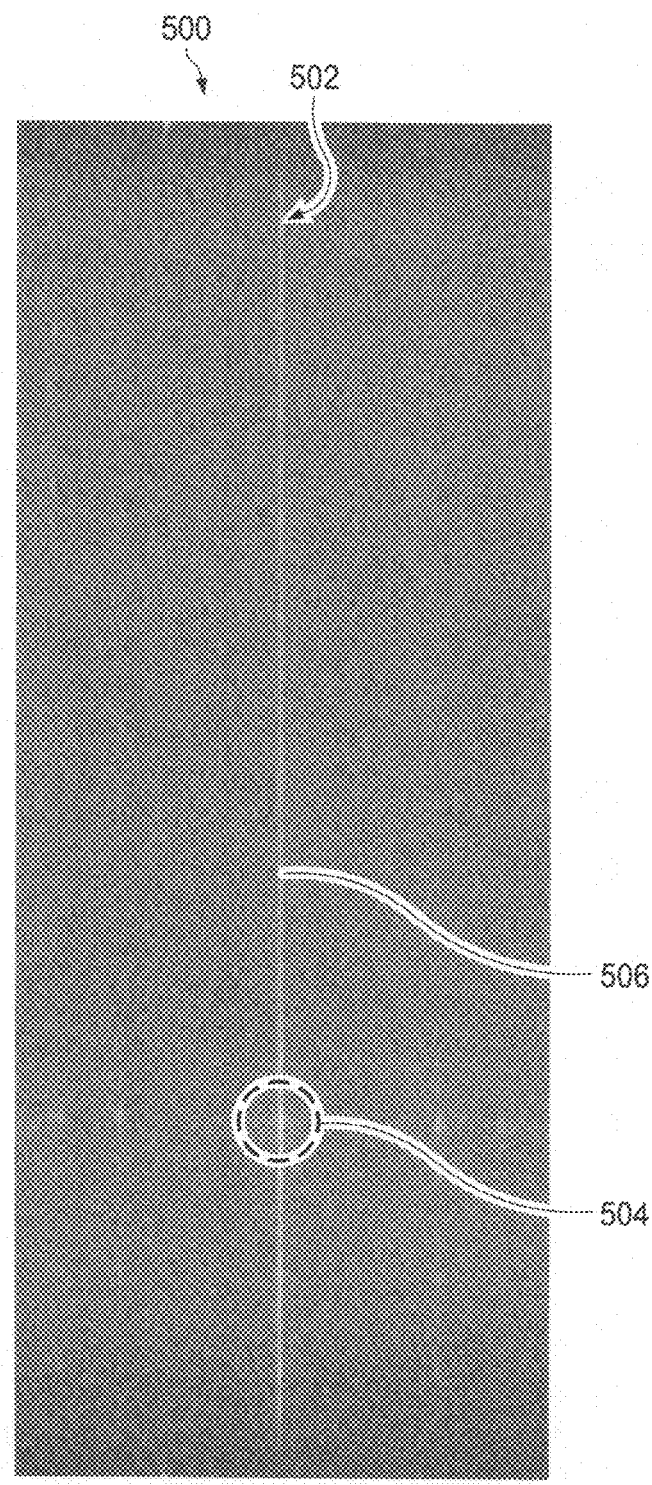
FIG. 5 is another illustration of a range-Doppler map in accordance with an illustrative embodiment.

Turning now to FIG. 5, an illustration of a range-Doppler map is depicted in accordance with an illustrative embodiment. In this illustrative example, the range-Doppler map 500 is an example of one implementation for the range-Doppler map 112 described in FIG. 1. A line 502 has been identified in the range-Doppler map 500. A first portion 504 of the line 502 is the only portion that represents a target. A second portion 506 of the line 502 represents clutter.

Figure 6:
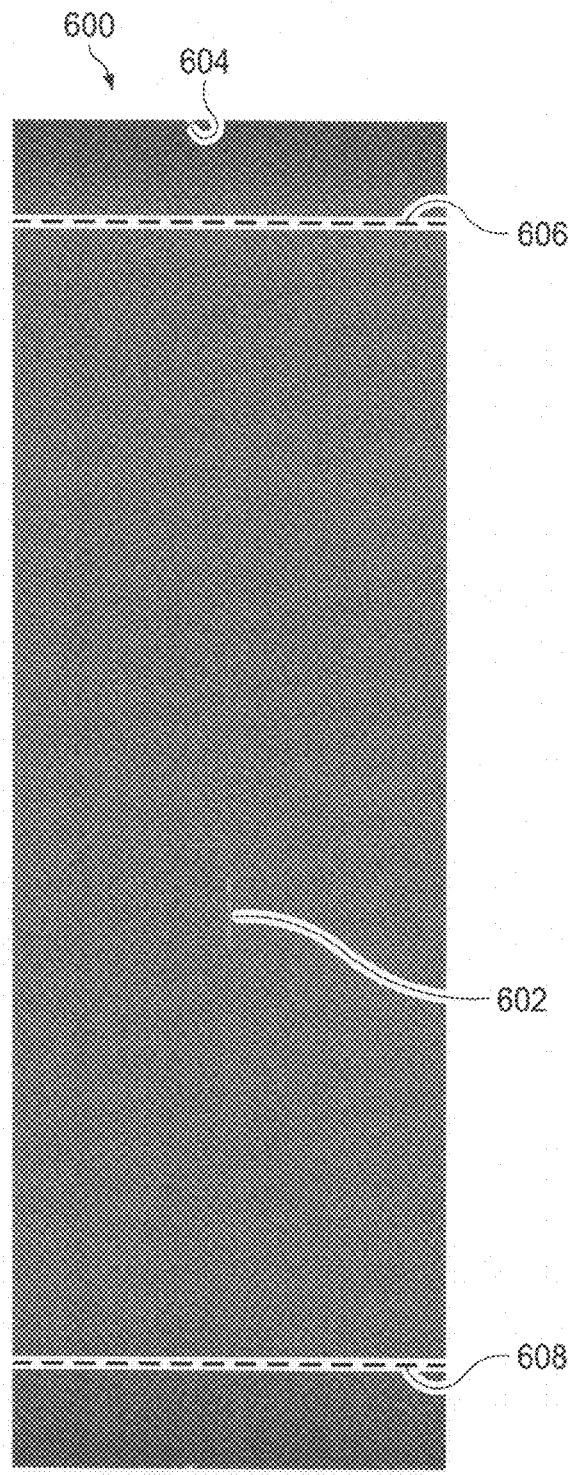
FIG. 6 is another illustration of a range-Doppler map in accordance with an illustrative embodiment.

With reference now to FIG. 6, an illustration of a range-Doppler map is depicted in accordance with an illustrative embodiment. In this illustrative example, the range-Doppler map 600 is an example of one implementation for the range-Doppler map 112 described in FIG. 1. As depicted, a first line 602 and a second line 604 have been detected.

Prior to classification of these lines, an upper image bound 606 and a lower image bound 608 may be used to process the range-Doppler map 600. The upper image bound 606 and the lower image bound 608 may be examples of the parameters 150 described in FIG. 1. Any lines that are found entirely above the upper image bound 606 or entirely below the lower image bound 608 may be removed from consideration as representing a target. In this manner, the second line 604 may be removed from consideration as representing a target. However, any line that is not entirely above the upper image bound 606 or entirely below the lower image bound 608 may still be considered as potentially representing a target.

Figure 7:
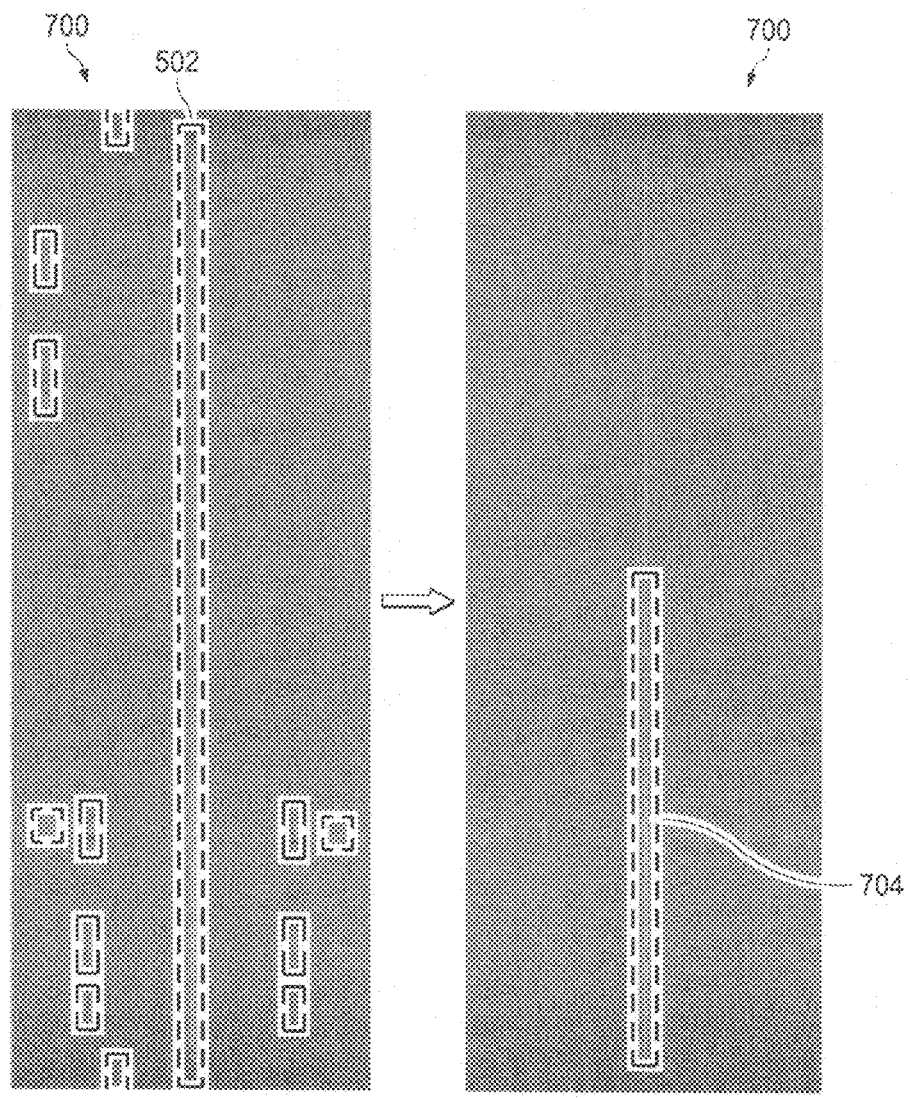
FIG. 7 is yet another illustration of a range-Doppler map in accordance with an illustrative embodiment.

With reference now to FIG. 7, yet another illustration of a range-Doppler map is depicted in accordance with an illustrative embodiment. In this illustrative example, the range-Doppler map 700 is an example of one implementation for the range-Doppler map 112 described in FIG. 1. When the range-Doppler map 112 is processed by the line detector 121 described in FIG. 1, bright lines 702 may be detected.

However, when processed by the classifier 122, only one bright line 704 is revealed as representing a target. The classifier 122 may remove all lines having horizontal components, or widths greater than one column, from consideration as representing targets.

Figure 8:
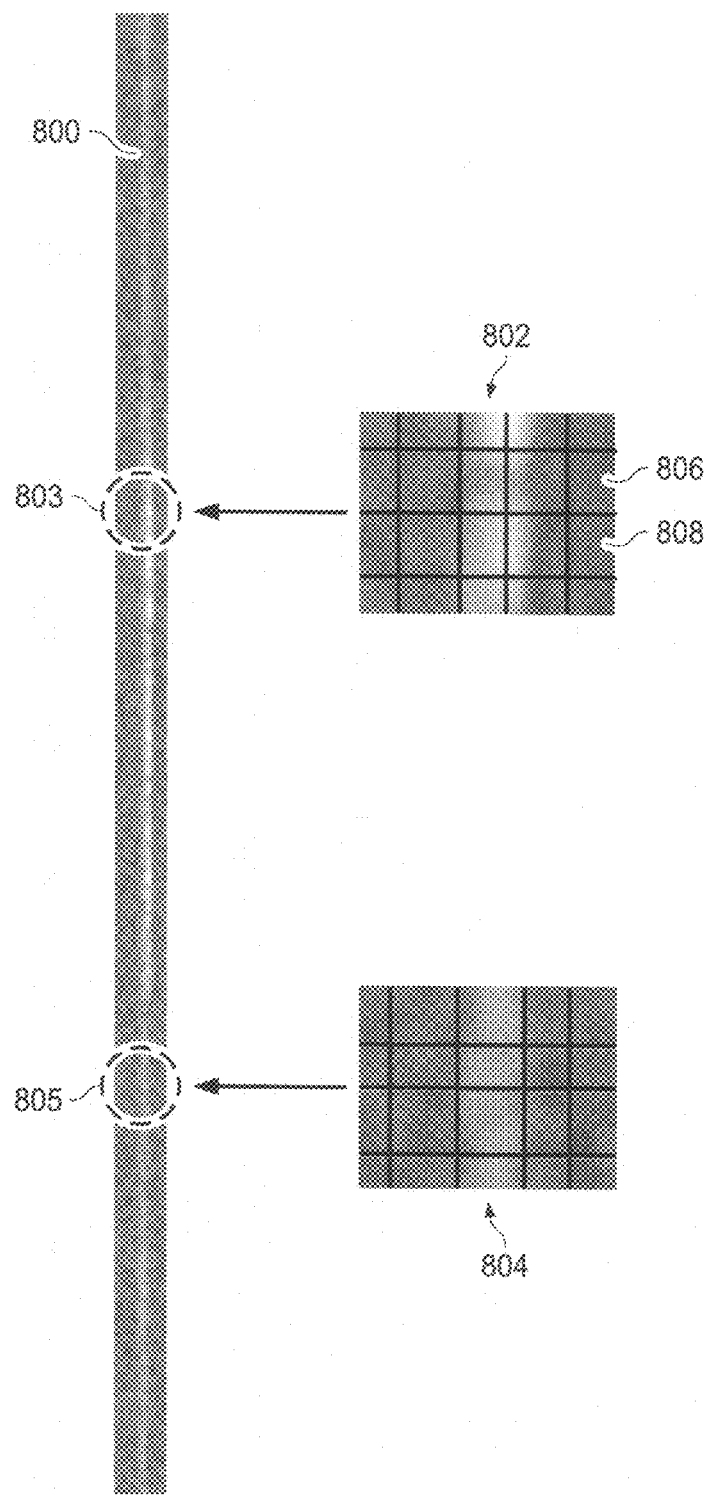
FIG. 8 is an illustration of feature vectors identified for a bright line in accordance with an illustrative embodiment.

With reference now to FIG. 8, an illustration of feature vectors identified for a bright line is depicted in accordance with an illustrative embodiment. In this illustrative example, a bright line 800 may be identified by the line detector 121 in FIG. 1. The classifier 122 in FIG. 1 may be configured to identify feature vectors for each of the bright pixels that form the bright line 800.

As depicted, feature vectors 802 may be identified for a portion 803 of the bright pixels in the bright line 800. Feature vectors 804 may be identified for the portion 805 of bright pixels in the bright line 800. Each of the feature vectors 802 and each of the feature vectors 804 may be selected as the row of pixels centered on the bright pixel in the bright line 800 having a selected width. In this example, the selected width may be five pixels. For example, the first feature vector 806 and the second feature vector 808 may each comprise five pixels centered on the bright pixel of the bright line 800.

Figure 9:
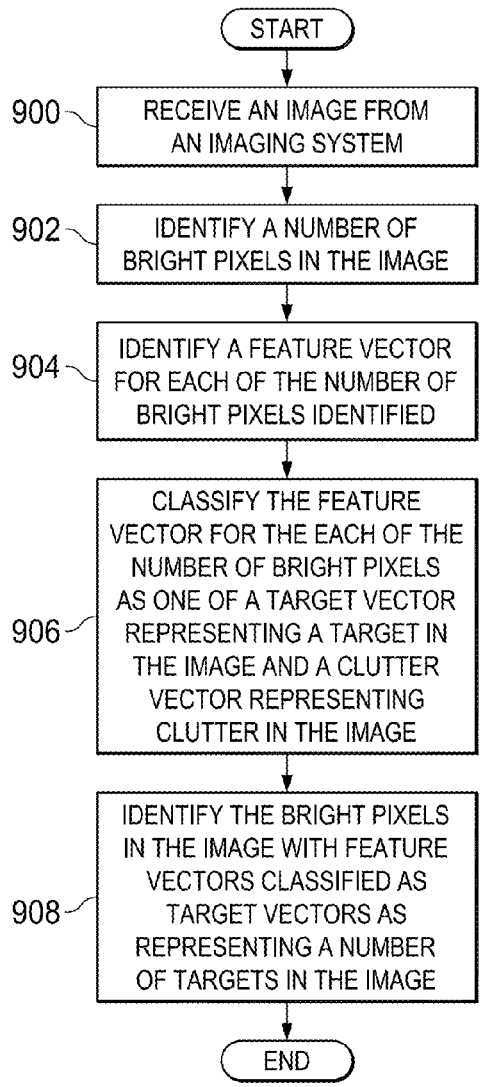
FIG. 9 is an illustration of a process for detecting targets in images in the form of a flowchart in accordance with an illustrative embodiment.

With reference now to FIG. 9, an illustration of a process for detecting targets in images is depicted in the form of a flowchart in accordance with an illustrative embodiment. The process illustrated in FIG. 9 may be implemented using target detector 118 in FIG. 1.

The process may begin by receiving an image from an imaging system (operation 900). The image received may be, for example, a radar image. In particular, the radar image may be a range-Doppler image. Next, the process identifies a number of bright pixels in the image (operation 902). The number of bright pixels may be the portion of pixels in the image having intensity values that meet selected intensity criteria.

Thereafter, the process identifies a feature vector for each of the number of bright pixels identified (operation 904). In operation 904, each feature vector may be based on a row of the pixels in the image having a selected width and centered at the corresponding bright pixel. The process then classifies the feature vector for each of the number of bright pixels as one of a target vector representing a target in the image and a clutter vector representing clutter in the image (operation 906). The bright pixels in the image with feature vectors classified as target vectors are identified as representing a number of targets in the image (operation 908), with the process terminating thereafter.

Figure 10:
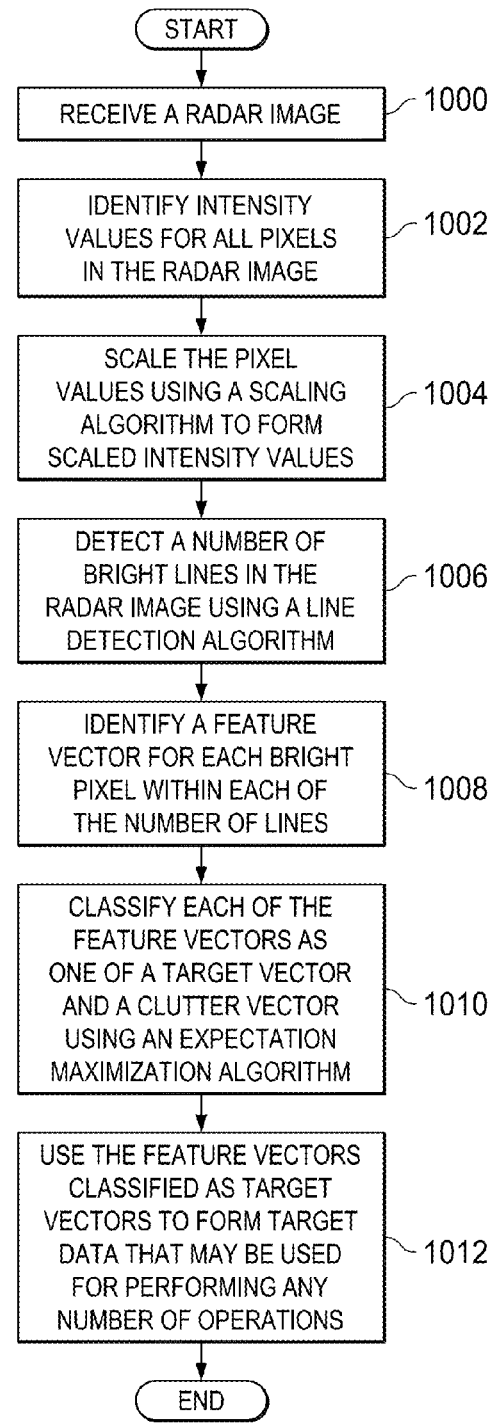
FIG. 10 is an illustration of a process for detecting targets in images in the form of a flowchart.

With reference now to FIG. 10, an illustration of a process for detecting targets in images is depicted in the form of a flowchart in accordance with an illustrative embodiment. The process illustrated in FIG. 10 may be implemented using target detector 118 in FIG. 1.

The process begins by receiving a radar image (operation 1000). The process identifies intensity values for all pixels in the radar image (operation 1002). Thereafter, the pixel values are scaled using a scaling algorithm to form scaled intensity values (operation 1004).

The scaling algorithm may comprise the following:

$$p(c, r)_{scaled} = \frac{p(c, r)}{\text{Mean}} * \text{Scaling\_Factor},$$

where $$\text{Mean} = \frac{\sum_{c=0}^{Cols-1} \sum_{r=0}^{Rows-1} p(c, r)}{Cols * Rows},$$

where $p(c,r)_{scaled}$ are the scaled pixel values, $p(c,r)$ are the pixel values, Scaling_Factor is the scaling factor by which the pixel values are being scaled, Mean is the mean pixel value of all of the pixels in the image, Cols are pixel columns, Rows are pixel rows, c is the selected column, and r is the selected row.

Next, a number of bright lines are detected in the radar image using a line detection algorithm (operation 1006). Each of the number of bright lines is a vertical bright line in the radar image. Further, each of the number of bright lines may be comprised of at least one bright pixel. In this illustrative example, a bright line may be a single pixel in the radar image or may be a column of pixels.

A feature vector is identified for each bright pixel within each of the number of lines (operation 1008). Each of the feature vectors is classified as one of a target vector and a clutter vector using an expectation maximization algorithm (operation 1010). In operation 1010, the expectation maximization algorithm may be used to label each of the feature vectors as being in one of two groups. The group having the higher mean center pixel values of the two groups may be identified as the target group comprising target vectors. The group having the lower mean center pixel values of the two groups may be identified as the clutter group comprising clutter vectors.

The feature vectors classified as target vectors are used to form target data that may be used for performing any number of operations (operation 1012), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 11, an illustration of a data processing system in the form of a block diagram is depicted in accordance with an illustrative embodiment. Data processing system 1100 may be used to implement one or more computers in the computer system 116 in FIG. 1. As depicted, data processing system 1100 includes communications framework 1102, which provides communications between processor unit 1104, storage devices 1106, communications unit 1108, input/output unit 1110, and display 1112. In some cases, communications framework 1102 may be implemented as a bus system.

Processor unit 1104 is configured to execute instructions for software to perform a number of operations. Processor unit 1104 may comprise a number of processors, a multiprocessor core, and/or some other type of processor, depending on the implementation. In some cases, processor unit 1104 may take the form of a hardware unit, such as a circuit system, an application specific integrated circuit (ASIC), a programmable logic device, or some other suitable type of hardware unit.

Instructions for the operating system, applications, and/or programs run by processor unit 1104 may be located in storage devices 1106. Storage devices 1106 may be in communication with processor unit 1104 through communications framework 1102. As used herein, a storage device, also referred to as a computer readable storage device, is any piece of hardware capable of storing information on a temporary and/or permanent basis. This information may include, but is not limited to, data, program code, and/or other information.

Memory 1114 and persistent storage 1116 are examples of storage devices 1106. Memory 1114 may take the form of, for example, a random access memory or some type of volatile or non-volatile storage device. Persistent storage 1116 may comprise any number of components or devices. For example, persistent storage 1116 may comprise a hard drive, a flash memory, a rewritable optical disk, a rewritable magnetic tape, or some combination of the above. The media used by persistent storage 1116 may or may not be removable.

Communications unit 1108 allows data processing system 1100 to communicate with other data processing systems and/or devices. Communications unit 1108 may provide communications using physical and/or wireless communications links.

Input/output unit 1110 allows input to be received from and output to be sent to other devices connected to data processing system 1100. For example, input/output unit 1110 may allow user input to be received through a keyboard, a mouse, and/or some other type of input device. As another example, input/output unit 1110 may allow output to be sent to a printer connected to data processing system 1100.

Display 1112 is configured to display information to a user. Display 1112 may comprise, for example, without limitation, a monitor, a touch screen, a laser display, a holographic display, a virtual display device, and/or some other type of display device.

In this illustrative example, the processes of the different illustrative embodiments may be performed by processor unit 1104 using computer-implemented instructions. These instructions may be referred to as program code, computer usable program code, or computer readable program code and may be read and executed by one or more processors in processor unit 1104.

In these examples, program code 1118 is located in a functional form on computer readable media 1120, which is selectively removable, and may be loaded onto or transferred to data processing system 1100 for execution by processor unit 1104. Program code 1118 and computer readable media 1120 together form computer program product 1122. In this illustrative example, computer readable media 1120 may be computer readable storage media 1124 or computer readable signal media 1126.

Computer readable storage media 1124 is a physical or tangible storage device used to store program code 1118 rather than a medium that propagates or transmits program code 1118. Computer readable storage media 1124 may be, for example, without limitation, an optical or magnetic disk or a persistent storage device that is connected to data processing system 1100.

Alternatively, program code 1118 may be transferred to data processing system 1100 using computer readable signal media 1126. Computer readable signal media 1126 may be, for example, a propagated data signal containing program code 1118. This data signal may be an electromagnetic signal, an optical signal, and/or some other type of signal that can be transmitted over physical and/or wireless communications links.

The illustration of data processing system 1100 in FIG. 11 is not meant to provide architectural limitations to the manner in which the illustrative embodiments may be implemented. The different illustrative embodiments may be implemented in a data processing system that includes components in addition to or in place of those illustrated for data processing system 1100. Further, components shown in FIG. 11 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    identifying, using an image processor implemented using a computer system comprising at least computer hardware, a number of bright pixels in an image, wherein each of the number of bright pixels belongs to a line detected in the image in which the line represents a candidate for a target;
    identifying, using the image processor, a number of feature vectors for the number of bright pixels in the image; and
    classifying, using the image processor, each of the number of feature vectors as one of a target vector representing the target and a clutter vector representing clutter.

2. The method of claim 1, wherein identifying the number of bright pixels in the image comprises:
    scaling, using the image processor, intensity values of pixels in the image to form modified intensity values for the pixels in the image; and selecting, using the image processor, a portion of the pixels in the image having a modified pixel value greater than a selected threshold as the number of bright pixels.

3. The method of claim 1, wherein identifying the number of feature vectors for the number of bright pixels in the image comprises:
   selecting, using the image processor, a subset of the number of bright pixels based on a number of parameters to form a filtered set of bright pixels; and
   identifying, using the image processor, a feature vector for each bright pixel in the filtered set of bright pixels, wherein the feature vector for a bright pixel in the filtered set of bright pixels is selected as a row of pixels in the image having a selected width centered at the bright pixel.

4. The method of claim 3, wherein selecting the subset of the number of bright pixels based on the number of parameters to form the filtered set of bright pixels comprises:
   selecting, using the image processor, the subset of the number of bright pixels based on the number of parameters to form the filtered set of bright pixels, wherein the number of parameters includes at least one of an upper image bound, a lower image bound, a line width, and symmetry.

5. The method of claim 1, wherein classifying the each of the number of feature vectors comprises:
   classifying, using the image processor, the each of the number of feature vectors as one of the target vector representing the target and the clutter vector representing the clutter using a maximum-likelihood estimation algorithm.

6. The method of claim 1, wherein classifying the each of the number of feature vectors comprises:
   classifying, using the image processor, the each of the number of feature vectors as one of the target vector representing the target and the clutter vector representing the clutter using an expectation maximization algorithm.

7. The method of claim 1 further comprising:
   generating, using the image processor, target data identifying a number of targets in the image.

8. A target detector comprising:
   a line detector, implemented using an image processor that is a computer system comprising at least computer hardware, configured to identify a number of bright pixels in an image, wherein each of the number of bright pixels belongs to a line that represents a candidate for a target; and
   a classifier, implemented using the image processor, configured to identify a number of feature vectors for the number of bright pixels in the image and classify each of the number of feature vectors as one of a target vector representing the target and a clutter vector representing clutter.

9. The target detector of claim 8 further comprising:
   a scaling unit, implemented using the image processor, configured to scale intensity values of pixels in the image to form modified intensity values for the pixels in the image.

10. The target detector of claim 9, wherein the line detector is further configured to select a portion of the pixels in the image having a modified pixel value greater than a selected threshold as the number of bright pixels.

11. The target detector of claim 8, wherein the classifier is further configured to select a subset of the number of bright pixels based on a number of parameters to form a filtered set of bright pixels and identify a feature vector for each bright pixel in the filtered set of bright pixels.

12. The target detector of claim 11, wherein the feature vector for a bright pixel in the filtered set of bright pixels is selected as a row of pixels in the image having a selected width centered at the bright pixel.

13. The target detector of claim 11, wherein the number of parameters includes at least one of an upper image bound, a lower image bound, a line width, and symmetry.

14. The target detector of claim 8, wherein the classifier is configured to classify the number of feature vectors using a maximum-likelihood estimation algorithm.

15. The target detector of claim 14, wherein the maximum-likelihood estimation algorithm is an expectation maximization algorithm.

16. The target detector of claim 8, wherein the target detector is configured to receive the image from a radar system.

17. The target detector of claim 8, wherein the image is a radar image.

18. The target detector of claim 17, wherein the radar image is a range-Doppler map and wherein the target is a maritime target.

19. A target detection system comprising:
   a radar system configured to generate a radar image; and
   a target detector, implemented using an image processor that is a computer system comprising at least computer hardware, configured to identify a number of bright pixels in the radar image, wherein each of the number of bright pixels belongs to a line that represents a candidate for a target; identify a number of feature vectors for the number of bright pixels in the radar image; and classify each of the number of feature vectors as one of a target vector representing the target and a clutter vector representing clutter.

20. The target detector of claim 19, wherein the target detector further comprises:
   a scaling unit, implemented using the image processor, configured to scale intensity values of pixels in the radar image to form modified intensity values for the pixels in the radar image.

* * * * *